(12) United States Patent
LeTourneau

(10) Patent No.: US 6,217,086 B1
(45) Date of Patent: Apr. 17, 2001

(54) APPARATUS FOR PRACTICING KNOT TYING AND METHOD OF USE

(76) Inventor: Dana LeTourneau, 12038 Jeanette Pl., Granada Hills, CA (US) 91344

( * ) Notice: Subject to any disclaimer, the term of this patent is extended or adjusted under 35 U.S.C. 154(b) by 0 days.

(21) Appl. No.: 09/407,698

(22) Filed: Sep. 28, 1999

(51) Int. Cl.[7] ................................................. B65H 69/04
(52) U.S. Cl. ........................ 289/18.1; 289/1.2; 289/1.5
(58) Field of Search ................. 289/2, 1.5, 16.5, 289/17, 18.1; 434/260; 223/111, 113, 81, 82, 83; 2/144, 148, 152.1

(56) References Cited

U.S. PATENT DOCUMENTS

| | | | | |
|---|---|---|---|---|
| 1,449,547 | * | 3/1923 | Quinlan | 289/2 |
| 2,385,197 | * | 9/1945 | Eisel | 434/260 |
| 2,469,037 | * | 5/1949 | Harvey | 289/17 |
| 2,595,235 | * | 5/1952 | Emrich | 24/18 |
| 2,773,713 | * | 12/1956 | Smalley | 289/17 |
| 2,778,210 | * | 1/1957 | Reizman et al. | 289/18.1 |
| 3,688,357 | * | 9/1972 | Nielsen et al. | 289/17 |
| 3,700,272 | * | 10/1972 | Bauer | 289/17 |
| 3,752,516 | * | 8/1973 | Mumma | 289/17 |
| 3,947,903 | * | 4/1976 | Menke | 5/111 |
| 4,014,570 | * | 3/1977 | Ruggles et al. | 289/17 |
| 4,059,906 | * | 11/1977 | Kurtz | 33/180 R |
| 4,400,025 | * | 8/1983 | Dennison | 289/17 |
| 4,607,869 | * | 8/1986 | Bersche | 289/17 |
| 5,240,295 | * | 8/1993 | Spencer | 289/2 |
| 5,562,456 | * | 10/1996 | Cianciotto | 434/260 |
| 5,577,299 | * | 11/1996 | Thompson et al. | 289/18.1 |
| 5,690,369 | * | 11/1997 | Steck, III | 289/17 |
| 5,690,370 | * | 11/1997 | Steck, III | 289/17 |

\* cited by examiner

*Primary Examiner*—John J. Calvert
*Assistant Examiner*—Gary L. Welch
(74) *Attorney, Agent, or Firm*—Timothy Thut Tyson; Ted Masters

(57) ABSTRACT

An apparatus for practicing knot tying (20) includes a base (22) to which is attached an inverted U-shaped member (24). A chain (44) is connected between the arms (40, 42) of the U-shaped member. A user then uses a rope (46) to practice tying knots about the U-shaped member and the chain. The chain can also be used to affix a rope for practicing the tying of bends. Knot-tying instruction cards (48) assist in the practice process.

4 Claims, 7 Drawing Sheets

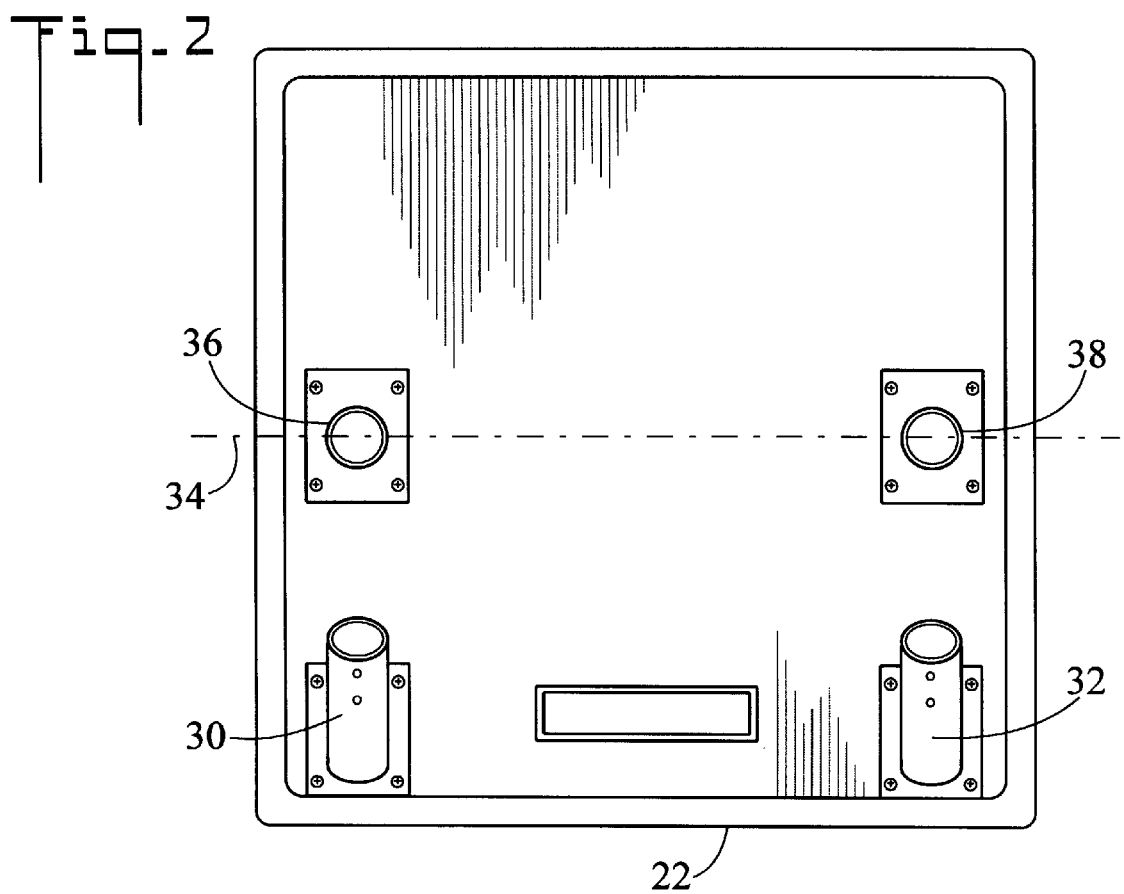
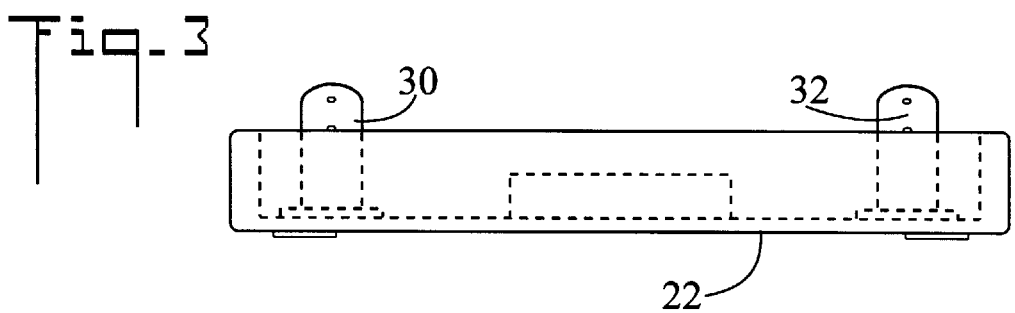
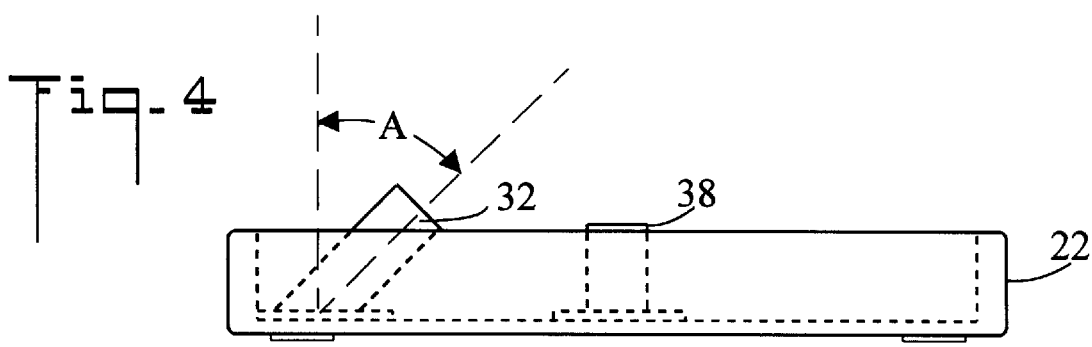

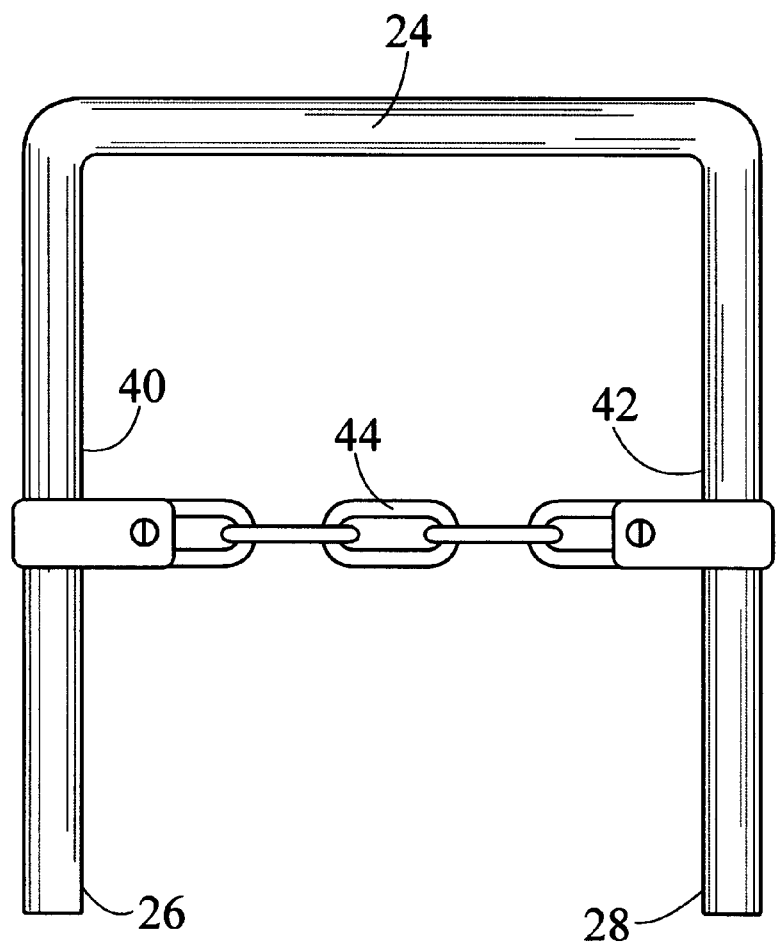
Fig_8
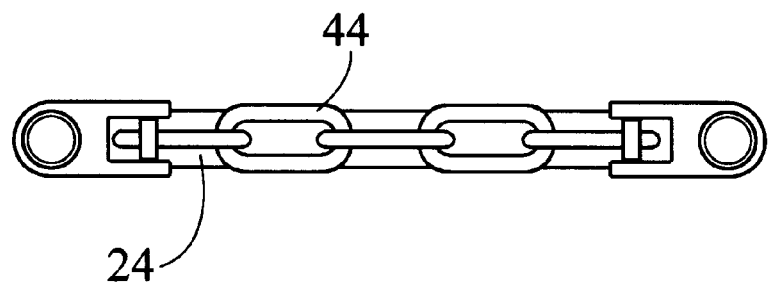
Fig_9

APPARATUS FOR PRACTICING KNOT TYING AND METHOD OF USE

TECHNICAL FIELD

The present invention pertains generally to tying knots with a rope, and in particular to an apparatus that provides a user with a convenient structure upon which nautical knot tying may be realistically practiced.

BACKGROUND ART

Tying knots with a rope is well known in the art. A variety of specialized knots are found particularly useful for application aboard boats or ships, such as in sailing. In challenging waters, the ability to tie the right knot for the situation, and to do so quickly, is often critically important. To perfect and retain nautical knot tying skills, the user must practice frequently. One method is to practice while on board the boat or ship using actual boat lines to tie knots to actual shipboard fixtures such as rails, anchor chains, D-rings, cleats, and the like. This practice method is quite effective in that actual regulation sized ropes and actual shipboard fixtures are used. However, when the vessel is not being utilized or is otherwise unavailable, this method is not possible and the time between practice sessions can resultantly extend to months. During these protracted periods, knot tying skills can diminish considerably.

To properly maintain knot tying skills, supplemental knot tying practice away from the boat is therefore required. This can be accomplished by utilizing commercially available knot tying aides, which typically comprise a collection of small sticks and strings, coupled with various knot tying instructions. Major drawbacks exist, however, in that the sticks and strings do not represent actual-sized shipboard fixtures and ropes, and consequently realistic knot tying cannot be practiced. Oftentimes the string will break in the effort of cinching a knot or cannot securely hold the sticks. Also, the sticks do not represent actual shipboard fixtures, and therefore association with an application on a boat is quite impossible.

Another possible method of practicing knot tying would consist of individually providing ropes and shipboard related fixtures. This too is troublesome in that many items have to be individually supplied, utilized, and then collected and commonly stored after each practice session.

Several prior art patents disclose inventions that relate to knot tying. For example, U.S. Pat. No. 1,449,547 describes a process for tying a bow tie about a package. U.S. Pat. No. 2,595,235 illustrates a device for holding a package while tying a cord around it. U.S. Pat. No. 3,688,357 comprises a macrame loom, which offers round structures for tying knots. U.S. Pat. No. 3,700,272 describes a fisherman's knot tying device for monofilament line which requires that the manufacturer's recommendations for knot tying be strictly observed in order to retain the full line strength. The knots described are quite complicated, and require a special rig to effect the tying process. U.S. Pat. No. 3,752,516 shows a knot tying jig for tying one type of special fisherman's knot on the end of a fishing line.

None of the prior art devices provide a device upon which the art of nautical knot tying may be realistically practiced. It is toward this objective that the present invention is targeted.

DISCLOSURE OF INVENTION

The present invention is directed to a jig like apparatus for practicing the tying of nautical knots which overcomes the disadvantages of the prior art. The present invention, known as a "KnotMaster", provides a platform which allows a user to practice tying commonly used knots. The invention provides simulated horizontal and vertical shipboard rails upon which realistic knot tying skills may be practiced. A simulated anchor chain is also provided to practice tying a rope to as well as a point to which a rope can be secured to practice bends (the joining of two ropes together). The present invention is exceptionally sturdy allowing a user to pull hard on a rope to cinch a knot. Additionally, the invention is easy to assemble and disassemble, and may be conveniently transported from location to location in a self-contained storage container. While the invention is primarily intended to elevate and maintain nautical knot tying skills, it may also be utilized by others in vocations such as truck driver to practice securing cargo with rope using knots.

In accordance with a preferred embodiment of the invention, an apparatus for practicing knot tying comprises a base having two spaced upwardly opening couplings. A substantially U-shaped member has two ends which are removably received by the couplings, so that the U-shaped member may be rigidly connected to the base.

In accordance with an important aspect of the invention, the base is rectangular and the couplings are opposingly mounted along one side. The couplings are angled at an angle of between substantially 30° and 60° from the vertical, so as to angle the U-shaped member away from the user.

In accordance with an important feature of the invention, two additional vertically oriented couplings are provided.

In accordance with another important aspect of the invention, a simulated anchor chain is connected between the two arms of the U-shaped member.

In accordance with another important feature of the invention, a plurality of ready reference knot tying instruction cards is disposed upon the base.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 2 is a top plan view of a base;

FIG. 3 is a front elevation view of the base;

FIG. 4 is a side elevation view of the base;

FIG. 8 is a top plan view of the U-shaped member with a chain attached;

FIG. 9 is an end elevation view of the U-shaped member and chain;

MODES FOR CARRYING OUT THE INVENTION

Figure 1:
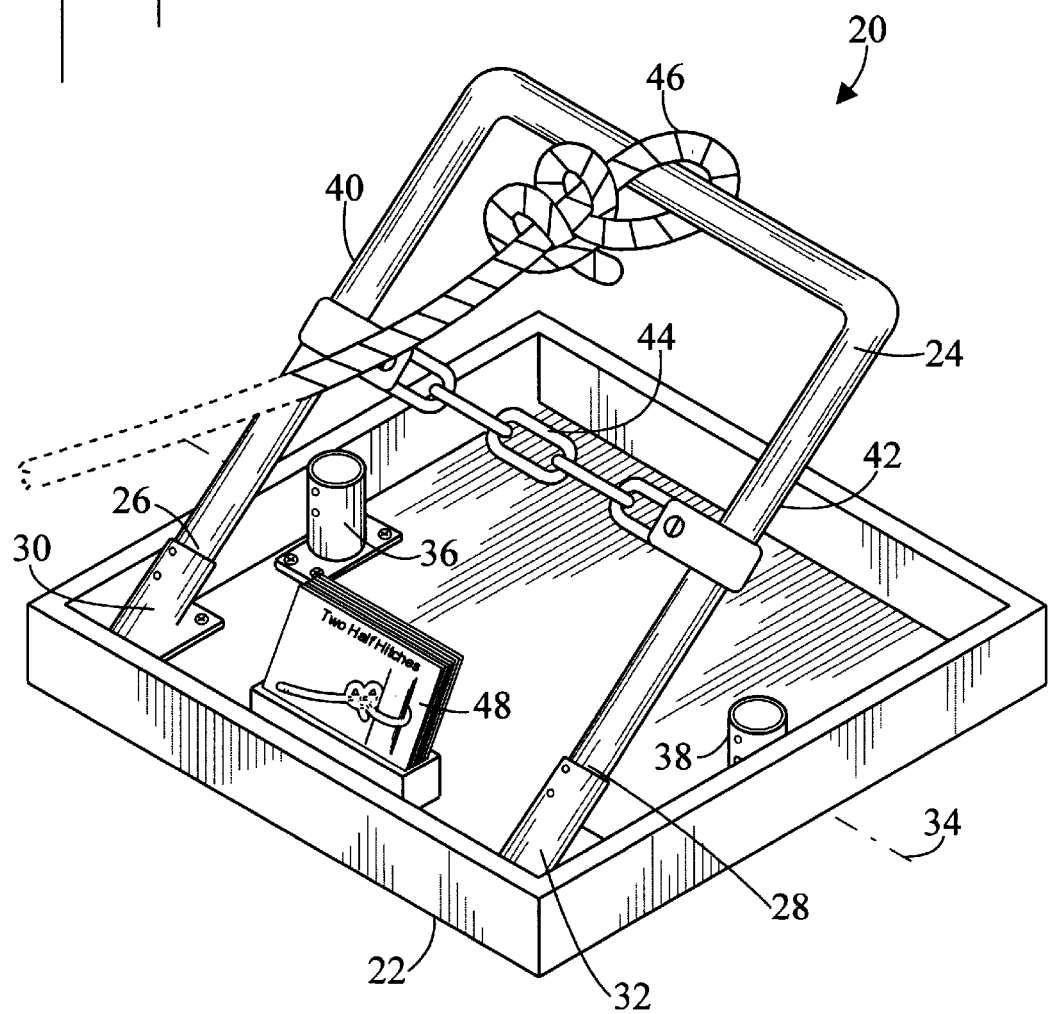
FIG. 1 is a perspective view of an apparatus for practicing knot tying in accordance with the present invention.

Referring initially to FIG. 1, there is illustrated a perspective view of an apparatus for practicing knot tying in accordance with the present invention, generally designated as 20. Apparatus 20 includes a base 22, which in preferred embodiments is fabricated from either wood or plastic, and has nonskid pads mounted on its underside. A substantially U-shaped member 24 having first and second ends 26, 28 is rigidly connected to base 22. In a preferred embodiment, U-shaped member 24 is fabricated from steel tubing. Base 22 has a first upwardly opening coupling 30 spaced from a second upwardly opening coupling 32. First and second ends 26, 28 of U-shaped member 24 are removably receivable by first and second couplings 30, 32, respectively. In a preferred embodiment, first and second ends 26, 28 are rigidly held in place by set screws mounted in the first and second couplings 30, 32. Base 22 has a central axis 34, and first 30 and second 32 couplings are oriented toward central axis 34 at an angle A of between substantially 30° and 60° (45° being preferred) with the vertical. The angle is useful in that it minimizes tipping of the apparatus as it is utilized, and also places U-shaped member 24 in a more convenient orientation when the user is above the apparatus 20.

Base 22 has a third upwardly opening coupling 36 spaced from a fourth upwardly opening coupling 38. Third and fourth couplings 36, 38 are oriented substantially vertically, and first and second ends 26, 28 of U-shaped member 24 are removably receivable by third and fourth couplings 36, 38, respectively. U-shaped member 24 has first and second arms 40, 42. A chain 44 is removable connected between first arm 40 and second arm 42. One or more lengths of rope 46 are provided for tying knots about U-shaped member 24 and chain 44. A plurality of knot tying instruction cards 48 is disposed upon base 22.

FIG. 2 is a top plan view of base 22.

FIG. 3 is a front elevation view of base 22

FIG. 4 is a side elevation view of base 22.

Figure 5:
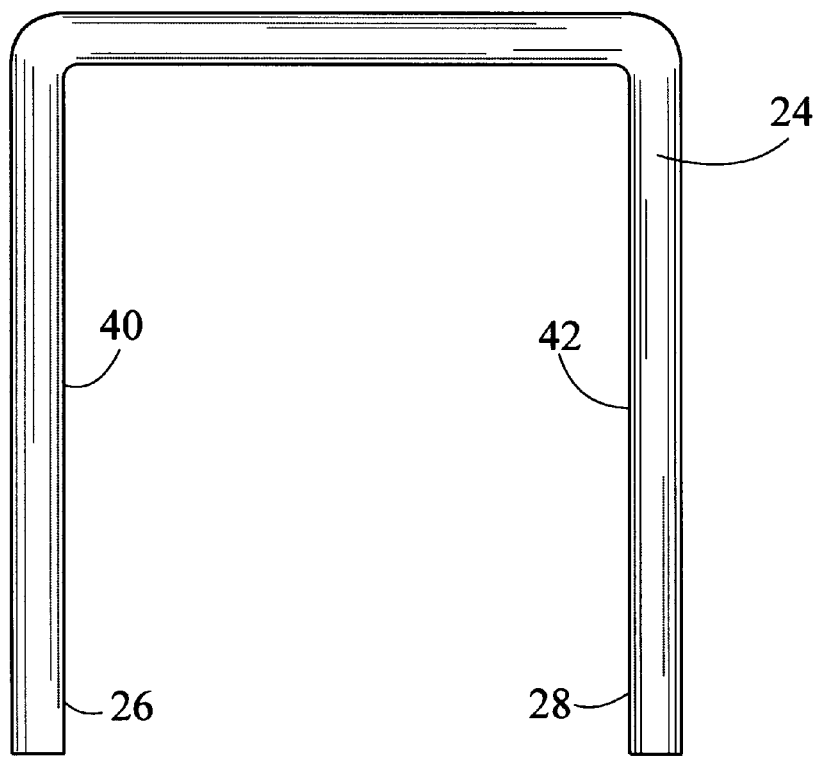
FIG. 5 is a top plan view of a U-shaped member.

FIG. 5 is a top plan view of U-shaped member 24.

Figure 6:
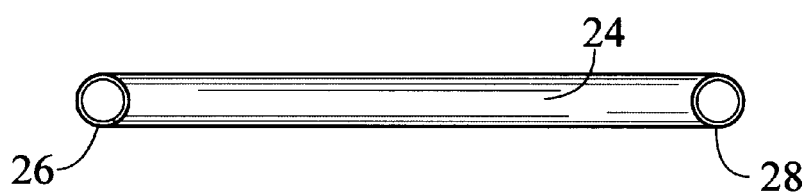
FIG. 6 is an end elevation view of the U-shaped member.

FIG. 6 is an end elevation view of U-shaped member 24.

Figure 7:
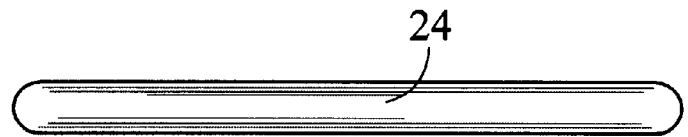
FIG. 7 is an opposite end elevation view of the U-shaped member.

FIG. 7 is an opposite end elevation view of U-shaped member 24.

FIG. 8 is a top plan view of U-shaped member 24 with a chain 44 attached.

FIG. 9 is an end elevation view of U-shaped member 24 and chain 44.

Figure 10:
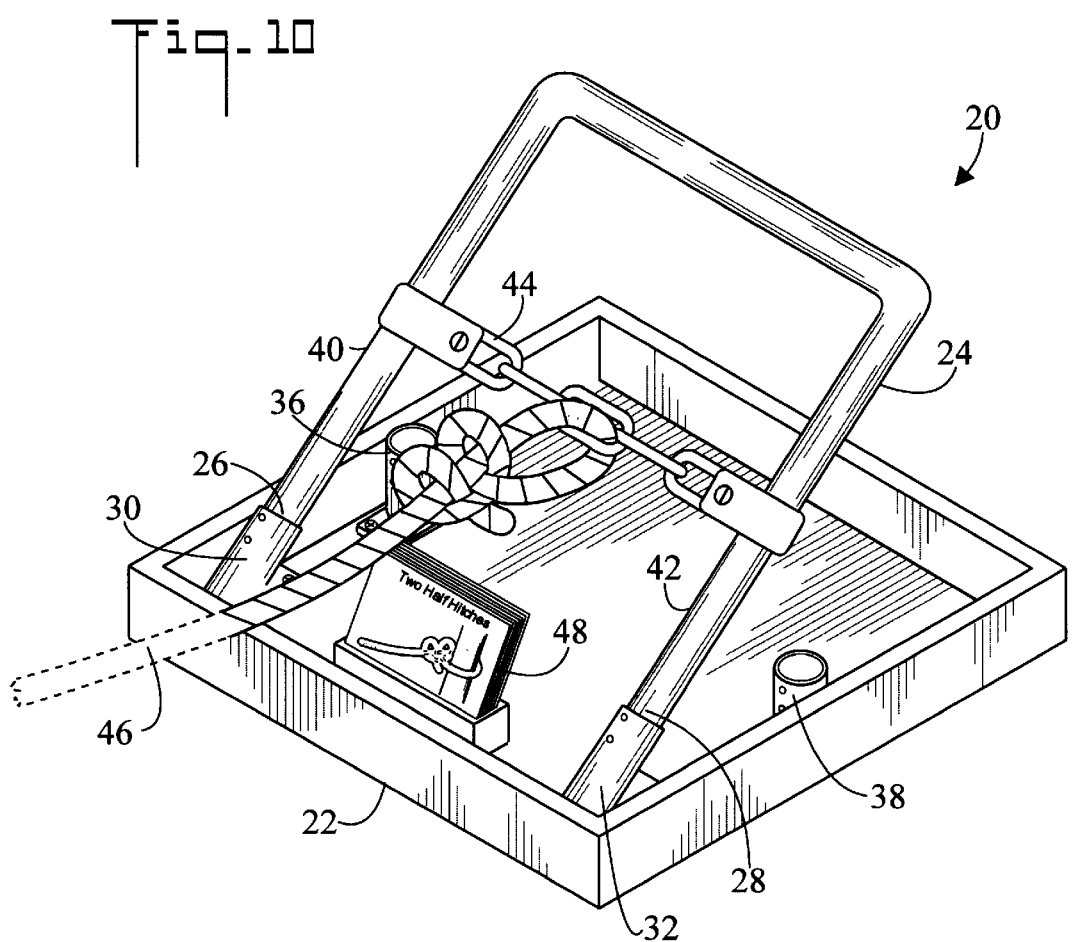
FIG. 10 is a perspective view of a rope attached to the chain.

FIG. 10 is a perspective view of rope 46 attached to chain 44.

Figure 11:
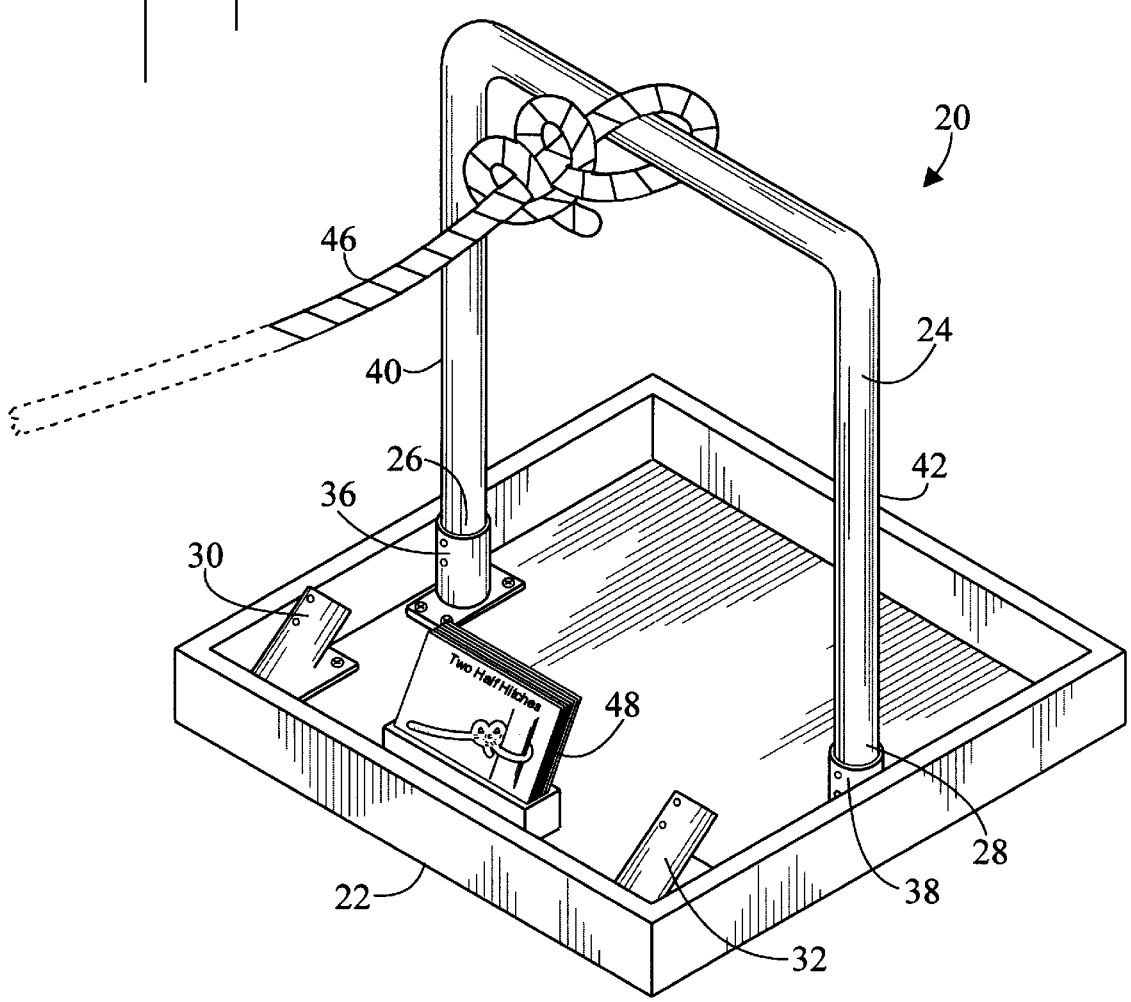
FIG. 11 is a perspective view of the U-shaped member in a vertical orientation; and, FIG. 12 is a perspective view of a storage container for storing the U-shaped member, chain, rope, and instruction cards.

FIG. 11 is a perspective view of U-shaped member 24 in a vertical orientation, connected to couplings 36 and 38.

Figure 12:
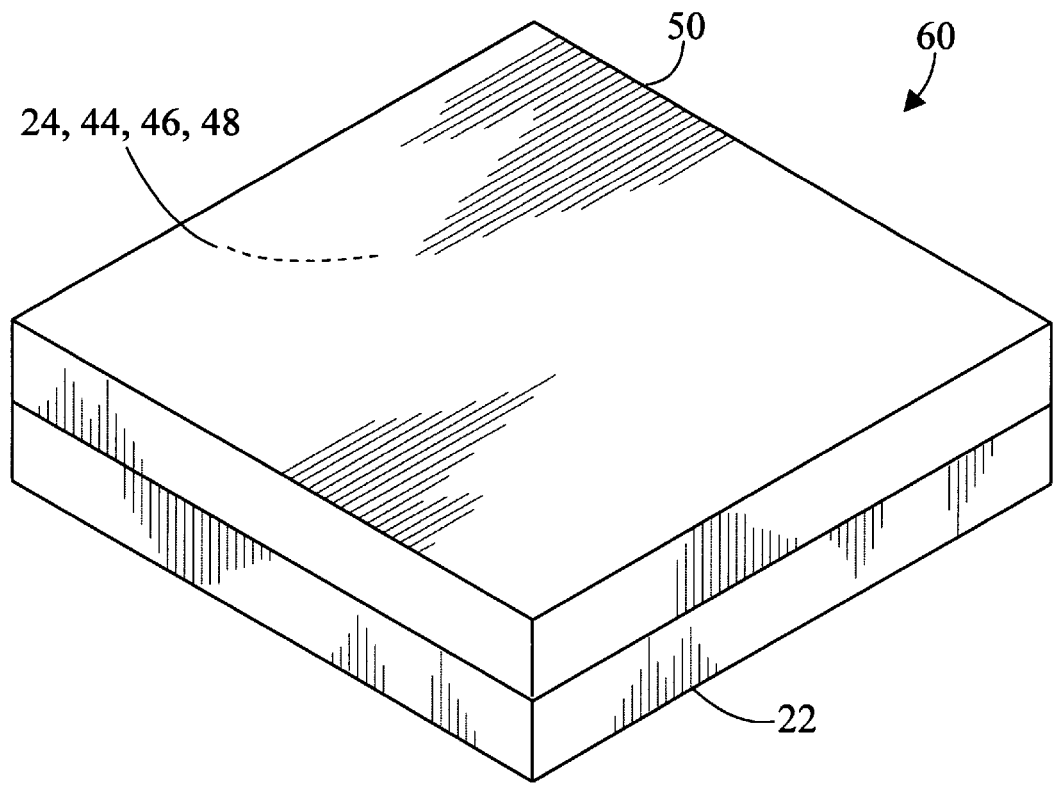

FIG. 12 is a perspective view of a storage container 60 for storing U-shaped member 24, chain 44, rope 46, and instruction cards 48. Storage container 60 comprises base 22 to which a top 50 has been attached.

Knot tying apparatus 20 is used by rigidly connecting the ends 26, 28 of U-shaped member 24 to angled couplings 30, 32 or vertical couplings 36, 38. Rope 46 is then used to practice tying a plurality of knot types about either U-shaped member 24 or chain 44. Instruction cards 48 may be utilized to assist in the knot tying process.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. An apparatus for practicing knot tying, comprising:

a base;

a substantially U-shaped member having first and second ends;

said ends rigidly connected to said base;

said base having a first upwardly opening coupling spaced from a second upwardly opening coupling;

said first and second ends receivable by said first and second couplings respectively;

said base having a central axis; and, said first and second couplings oriented toward said central axis at an angle of between substantially 30° and 60° from vertical, so that said U-shaped member is angled toward said central axis.

2. An apparatus according to claim 1, wherein said angle is substantially 45°.

3. An apparatus for practicing knot tying, comprising:

a base;

a substantially U-shaped member having first and second;

said ends rigidly connected to said base;

said base having a first upwardly opening coupling spaced from a second upwardly opening coupling;

said first and second ends removably receivable by said first and second couplings respectively;

said first and second couplings oriented at an angle of between substantially 30° and 60° from the vertical;

said U-shaped member having first and second arms;

a chain removably connected between said first and second arms;

a length of rope for tying knots about said U-shaped member;

a plurality of knot-tying instruction cards disposed upon said base;

a top cooperating with said base to form a storage container; and, said U-shaped member, said chain, said rope, and said instruction cards disposable within said storage container.

4. A method for practicing knot tying, comprising:

providing a length of rope;

providing a base having two spaced upwardly opening couplings, and a substantially U-shaped member having two ends removably receivable by said couplings;

connecting said ends of said U-shaped member to said couplings;

utilizing said rope to practice knot tying about said U-shaped member;

providing said U-shaped member with first and second arms;

providing a chain connected between said first and second arms; and, utilizing said rope to practice knot tying about said chain.

\* \* \* \* \*